United States Patent [19]

Ricci

[11] 4,136,382
[45] Jan. 23, 1979

[54] CONVERTER SYSTEM

[75] Inventor: Ronald L. Ricci, Madison, N.J.

[73] Assignee: Exxon Research & Engineering Co., Florham Park, N.J.

[21] Appl. No.: 870,515

[22] Filed: Jan. 18, 1978

[51] Int. Cl.² .......................................... H02M 7/757
[52] U.S. Cl. ................................... 363/137; 363/128; 320/57
[58] Field of Search ................... 307/10 R; 320/2, 57, 320/59, 60; 363/123, 125, 128, 129, 136, 137

[56] References Cited

U.S. PATENT DOCUMENTS

| 3,044,023 | 7/1962 | Floyd | 320/60 X |
| 3,293,445 | 12/1966 | Levy | 363/127 X |
| 3,321,695 | 5/1967 | Augier | 363/76 X |
| 3,339,080 | 8/1967 | Howald | 363/127 X |

*Primary Examiner*—William M. Shoop
*Attorney, Agent, or Firm*—Kenneth Watov

[57] ABSTRACT

A converter in one embodiment including six solid-state switches arranged as a three-phase bridge circuit operable in a first mode for inverting the DC voltage from a battery into a plural phase AC output voltage, and operable in a second mode as a single-phase bridge rectifier for controllably rectifying single-phase AC line voltage into a DC voltage. An AC relay in its de-energized state has switch contacts for connecting the three-phase AC output voltage to three output terminals, and the battery voltage across the bridge circuit for inversion. A single-phase AC line voltage is connected to the converter for energizing the relay, for disconnecting the bridge from the output terminals, for connecting the AC line voltage to the bridge for rectification thereof, and for reversing the connections of the battery to the bridge. A microprocessor is preprogrammed for controlling the operation of the bridge circuit for either the inversion or rectification modes of operation.

16 Claims, 2 Drawing Figures

CONVERTER SYSTEM

The field of the present invention relates generally to converter systems, and more specifically to such systems for selectively providing either inversion or rectification at a given time.

Converter systems for both inverting a DC voltage into a single or plural phase AC voltage, and rectifying such AC voltages into a DC voltage are generally known. Many of these systems include a separate inverter for DC to AC conversion, and rectifier for AC to DC conversion for recharging a battery, which tends to increase the weight and complexity of the system. Many applications for converter systems, AC motor electric drive systems for electric vehicles being one example, require minimization of the weight and complexity and cost of the converter.

The present inventor, in recognition of the problems in the prior art, has invented a converter system including the combination of a solid-state three-phase bridge circuit operable as either an inverter or rectifier, switching means and logic means forming a controller responsive to the connection thereto of a single-phase AC voltage, for operating the bridge circuit to rectify this AC voltage, and responsive to the disconnection of this AC voltage for operating the bridge circuit to invert a DC voltage into a plural-phase AC voltage.

Figure 1:
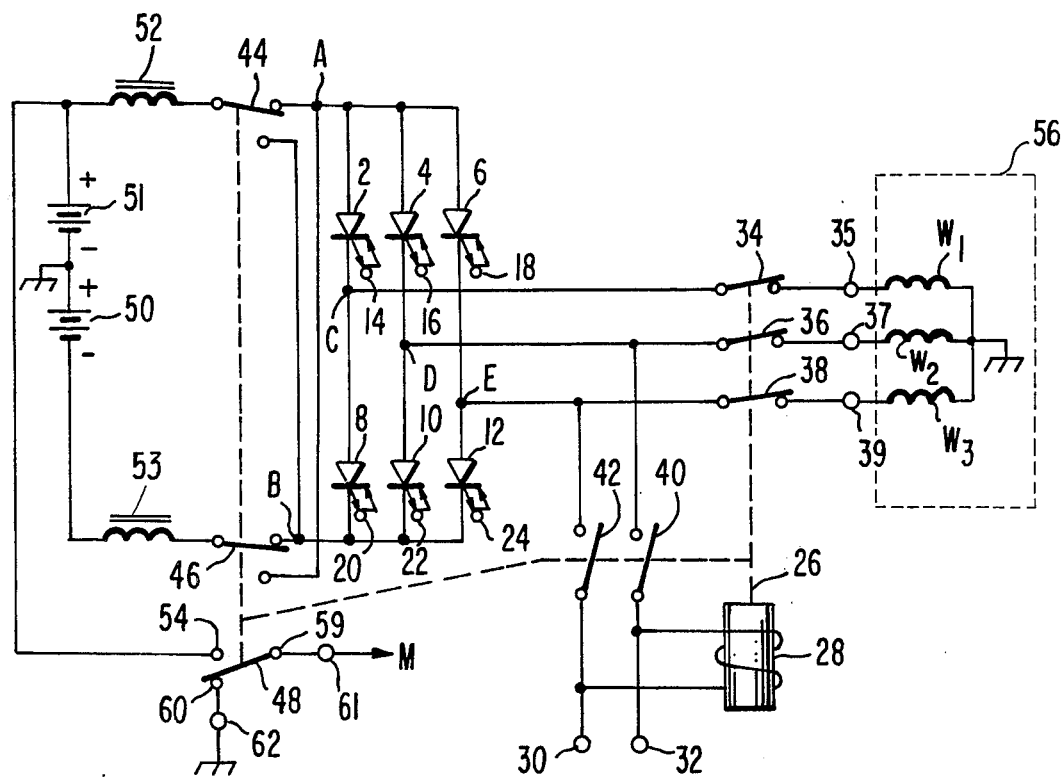
FIG. 1 is a circuit schematic diagram of the invention.

In FIG. 1, six solid-state switches or current control devices 2,4,6,8,10,12 are arranged as a three-phase bridge network, and each are shown as gate turnoff silicon-controlled rectifiers (GTO's), for example. Other devices that can be substituted for the GTO's 2,4,6,8,10,12 include standard silicon-controlled rectifiers (SCR's), Darlington transistor switches, bipolar switching transistors, triacs, and so forth, as would be known to one skilled in the art. The diodes required for nonzero power factor operation of the inverter are not shown (each solid-state switch 2,4,6,8,10,12 with a diode connected in antiparallel across the main current path of the switch, i.e. anode-cathode [GTO, SCR, triac], collector-emitter [bipolar transistor]).

As shown, GTO's 2,4 and 6 have their anode electrodes connected in common to a first node A. GTO's 8,10 and 12 have their cathode electrodes connected in common to a second node B. The cathode electrodes of GTO's 2,4 and 6 are individually connected at nodes C,D and E to the anode electrodes of GTO's 8,10 and 12, respectively. Each one of the GTO's 2,4,6,8,10,12 also have a gate or control electrode 14,16,18,20,22,24, respectively, for receiving a control signal.

GTO's are solid-state switches which are responsive to a positive level of control signal applied to their gate electrode, for turning on (lowering the impedance between their anode and cathode electrodes to conduct current from the anode to the cathode), and to a control signal at ground or a negative level for turning off (substantially raising the impedance between their anode and cathode electrodes).

Silicon-controlled rectifiers are solid-state switches which, similar to GTO's can be turned on by applying a control signal having a positive level to their gate electrode, but cannot be turned off via a control signal applied to their gate. SCR's are turned off by either reverse biasing their anode or cathode electrodes, or by reducing the flow of current therebetween to zero (GTO's can also be turned off in this manner). A triac is simply a pair of SCR's connected in antiparallel, for conducting current in either direction.

A bipolar switching transistor, such as NPN transistor, can be turned on by applying a positive signal to its base electrode, for conducting current between its collector and emitter electrodes, and turned off by applying a negative or ground level signal to its base electrode. The same is true of a PNP transistor, except the polarity of the control signals and voltages must be reversed. NPN transistors are normally preferred for use in switching applications because of their relatively higher power handling capability, in comparison to a PNP transistor.

If SCR's or triacs are substituted for the GTO's 2,4,6,8,10,12 of the bridge network, the connection of such devices is obvious from FIG. 1 in that each has gate, anode, and cathode electrodes. If NPN switching transistors are substituted for the GTO's, the transistors have their base electrodes connected as the gate electrodes of the GTO's their collector electrodes as the anode electrodes of the GTO's and their emitter electrodes as the cathode electrodes of the GTO's. If PNP switching transistors are substituted for the GTO's, the base collector and emitter electrodes of the PNP's would be connected as the gate, cathodes, and anodes, respectively, of the GTO's.

A relay 26 has a coil or winding 28 connected across a pair of input terminals 30 and 32 for receiving a single-phase AC line voltage. The switches 34,36,38,40,42,44,46,48 of the relay 26 are shown in the de-energized state of the relay (AC line voltage is not connected across terminals 30,32).

Batteries 50,51 are connected in series with a choke winding 53 between the pole of a single-pole-double-throw switch (SPDT) 46 of relay 26 and the common connection of a choke winding 52 and the normally-open contact 54 of SPDT 48. The other end of the choke 52 is connected to the pole of SPDT 44. The common connection between the batteries 50,51 is connected to a common ground or point of reference potential. The chokes 52,53 help to maintain the magnitude of current flowing between the batteries 50,51, respectively, and the bridge network. For single or balanced three-phase inverter operation the battery 51 and choke 53 can be eliminated along with the chassis ground connections to battery 50 and the motor windings $W_1, W_2, W_3$, as would be clear to one skilled in the art. Alternatively, only the common grounds to batteries 50,51 and to windings $W_1, W_2$ and $W_3$ can be removed for balanced three-phase inverter operation.

In this example, the three-phase AC output terminals 35,37,39 are shown connected to the three-phase windings $W_1, W_2, W_3$ respectively, of an AC motor 56. The speed of the motor 56 is controlled via adjustment of the frequency and amplitude of the voltage applied to the armature windings $W_1, W_2, W_3$ of the motor 56. Additionally, for motors having accessible field windings, the speed can also be controlled by appropriate adjustment of the magnitude of the field current. It should be noted that the motor windings $W_1, W_2, W_3$, although shown in a wye configuration, could also be in a delta configuration with the common grounds to batteries 50,51 and windings $W_1, W_2, W_3$ removed.

Figure 2:
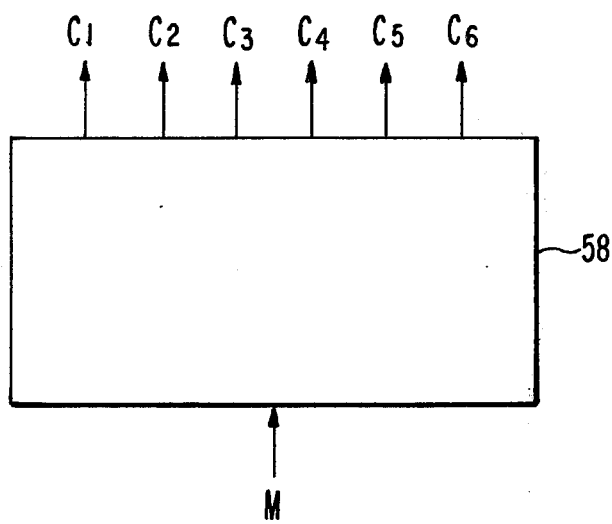
FIG. 2 is a block diagram of a controller element of the present invention.

In FIG. 2, a controller 58 is shown, responsive to a mode signal M, for producing control signals $C_1$ through $C_6$ for operating the solid-state switches 2,4,6,8,10,12 for either inversion of the DC voltage from a single battery 50 (or split battery 50,51), or rectification of single-phase AC line voltage. The controller 58 can consist of hardwired digital logic or be a preprogrammed or programmable microprocessor system.

In operation, if a single-phase AC voltage is not connected across terminals 30 and 32, the mode signal M is at ground via the pole 59 of SPDT switch 48 being connected to the normally-closed contact 60. The contact 60 is connected to reference terminal 62, the latter being connected to a point of reference potential, a local ground in this example. Accordingly, the mode signal M produced at terminal 61 is at ground, and controller 58 responds thereto for producing control signals $C_1$-$C_6$ for operating the bridge network as an inverter. In this first mode of operation, the DC voltages from batteries 50,51 are inverted into first, second, and third phases of AC voltage at nodes C, D, E, respectively. The normally-closed switch contacts 34,36,38 connect the three-phase AC voltage to output terminals 35,37,39 respectively. In this example, the load comprising motor windings $W_1,W_2,W_3$ is energized for operating the AC motor of an electric vehicle. At this time, the normally-open switches 40 and 42 prevent the AC voltages at nodes D and E from being applied to the relay winding or coil 28. Clearly, three-phase loads other than an AC motor can be driven by this converter system; and the bridge inverter can also be controlled for providing a single- or two-phase AC output voltage, if required, by modifying the controller 58, via re-programming of the microprocessor, for example. Where single- or two-phase inverter operation is employed, two of the solid-state switches, such as 2 and 8, can be eliminated. Regardless of the number of phases, an even number of at least four such solid-state switches are required.

Assuming that the present converter system is included in the drive system of an electric vehicle, after driving the vehicle it is desirable to recharge the batteries 50,51. All that is required is to connect terminals 30 and 32 to a single-phase AC voltage, such as an ordinary 120 V AC line. When the AC line is so connected across terminals 30 and 32, relay coil 28 is energized causing switches 34, 36 and 38 to open, for disconnecting output terminals 35,37, 39 from nodes C,D,E, respectively; switches 40 and 42 close for applying the single-phase AC voltage across nodes D and E; SPDT switches are operated for reversing the connection of the series circuit of batteries 50,51 and chokes 52,53 to the bridge network; and SPDT switch 48 is operated for placing its pole at its normally-open contact 54, thereby changing the level of the mode signal M from ground to the positive level of the battery 51. In response to the now positive mode signal M, the controller 58 provides control signals for keeping solid-state switches 2 and 8 de-energized, while operating solid-state switches 4,6,10 and 12 for providing full-wave rectification of the single-phase AC voltage. The resultant DC voltage is applied via switches 44 and 46 across the series circuit of chokes 52,53 and batteries 50,51 for recharging the batteries 50,51. Logic is provided in the controller for sensing the level of the voltage on the M signal line to control the operation of the rectifier for lowering the rate of charge as the batteries take on charge. (The conduction times or angles of the solid-state switches are controlled relative to each half-cycle of the AC voltage, for turning on the switches for some percentage of the occurrence of each half-cycle, the greater the percentage, the greater the rate of charge.)

It should be noted that although the switches 40 and 42 are shown connected in FIG. 1 for closing to apply the single-phase AC voltage across nodes D and E in the rectification mode, this voltage can alternatively be applied across any two of the nodes C,D and E. Of course, the controller 58 must be configured for providing the appropriate levels of control signals $C_1$-$C_6$, for a given connection of the single-phase AC voltage to the bridge. Also, in the inversion and rectification modes of operation of the converter, the solid-state switches 2,4,6,8,10,12 can be selectively turned on and off directly via control signals $C_1$-$C_6$, when GTO's or switching transistors are used for the solid-state switches. When SCR's or triacs are used for the solid-state switches, the control signals $C_1$-$C_6$ are applied thereto for placing the SCR's or triacs into a conductive state, but once in conduction, such devices must be forced to a nonconductive state by reducing the current flow to zero, for example. There are many known circuit means for forcing a conducting SCR into a nonconductive state (such means not shown). In the rectification mode of the converter, conducting ones of the SCR's or triacs are naturally commutated to the nonconductive state every time the single-phase AC current wave crosses zero. In the inverting mode of the converter, the conducting ones of the SCR's or triacs must be forced to the nonconducting state by any one of a number of known circuit means that can be included in the controller 58. One advantage of using switching transistors or GTO's for the bridge network, is that additional circuitry for commutating these devices to the nonconductive state is not required.

What is claimed is:

1. A conversion system operable to a first condition for inverting a DC voltage from a battery to a three-phase AC output voltage, and operable to a second condition in response to a single-phase AC voltage, for rectifying the single-phase AC voltage to a DC voltage for charging the battery, said system comprising:

a mode terminal where a mode signal is produced;

said battery having a positive terminal and a negative terminal;

first and second input terminals for receiving a single-phase AC voltage;

first through third output terminals where first, second and third phases, respectively, of said three-phase AC output voltage are developed;

a reference terminal for receiving a source of reference potential;

first through sixth solid-state switches, each having a control electrode receptive of a control signal, and a main current conduction path between first and second electrodes having a relatively high impedance in the presence of a low-level control signal, and a relatively low impedance in the presence of a high-level control signal, the second electrodes of said first through third switches being individually connected to the first electrodes of said fourth through sixth switches, respectively;

an AC relay having an operating coil connected across said first and second input terminals, first through third normally-closed single-pole-single-throw switch contacts connected between said first through third output terminals and the common connections between said first and fourth, second and fifth, and third and sixth solid-state switches, respectively, first and second normally-open single-pole-single-throw switch contacts connected between said first and second input terminals and the common connections of said second and fifth, and third and sixth solid-state switches, respectively, a first single-pole-double-throw switch having a pole connected to the positive terminal of said battery, a normally-closed contact connected in common to the first electrodes of said first through third solid-state switches, and a normally-open contact connected in common to the second electrodes of said fourth, fifth and sixth solid-state switches, a second single-pole-double-throw switch having a pole connected to the negative terminal of said battery, a normally-closed contact and a normally-open contact connected individually to the normally-open and normally-closed contacts, respectively, of said first single-pole-double-throw switch, and a third single-pole-double-throw switch having a pole connected to said mode terminal, a normally-open contact connected to the positive terminal of said battery, and a normally-closed contact connected to said reference terminal; and controller means for producing first through sixth control signals for operating said first through sixth solid-state switches, respectively, whereby whenever said single-phase AC voltage is applied between said first and second input terminals, said coil of said AC relay is energized for connecting the poles of said switches of said relay to their respective normally-open contacts, and disconnecting the poles from their associative normally-closed contacts, causing said mode signal to be at said reference potential level, said controller means being responsive to said mode signal at this time for operating said solid-state switches for said first condition of said system, and whenever said single-phase AC voltage is not applied between said first and second input terminals, said relay is de-energized with its switches being returned to their "normal" states, said controller means is responsive to said mode signal having a positive voltage level at this time for operating said solid-state switches for said second condition of said system.

2. The system of claim 1 wherein said controller means includes a microprocessor.

3. The system of claim 2, wherein said microprocessor is programmed to automatically change the relationship between the conduction times or angles of said second, third, fifth and sixth solid-state switches relative to each half-cycle of said single-phase AC voltage, in response to an increasing level of said mode signal as said battery charges, for rectifying a succeedingly smaller portion of the waveform of said single-phase AC voltage, thereby reducing the charging rate of said battery as the latter approaches full charge.

4. The system of claim 1, wherein said first through sixth solid-state switches each include a gate turnoff silicon controlled rectifier having a gate electrode as said control electrode, an anode electrode as said first electrode, and a cathode electrode as said second electrode.

5. The system of claim 1, wherein said first through sixth solid-state switches each include a bipolar switching transistor having a base electrode as said control electrode.

6. A system for providing a three-phase bridge inverter selectively convertible to a single-phase bridge rectifier, comprising:

first through sixth solid-state switches each having a control electrode, a first electrode, and a second electrode, the first electrodes of said first through third solid-state switches being connected together at a first node, the second electrodes of said fourth through sixth solid-state switches being connected together at a second node, the respective second and first electrodes of said first and fourth, second and fifth, and third and sixth switches, being connected together at third, fourth and fifth nodes, respectively;

a source of DC voltage having positive and negative terminals;

first through third output terminals;

a pair of input terminals for receiving a single-phase AC voltage;

a reference terminal for connection to a point of reference potential;

first switching means responsive to the connection of said single-phase AC voltage across said pair of input terminals, for substantially simultaneously (1) connecting said AC voltage across a predetermined two of said third, fourth and fifth nodes; (2) producing a mode signal having a first level of voltage and responsive to the removal of said AC voltage from said input terminals for substantially simultaneously (1) connecting said third, fourth and fifth nodes to said first, second, and third output terminals, respectively; (2) said first node to the positive terminal of said source of DC voltage; (3) said second node to the negative terminal of said source of DC voltage; and (4) producing said mode signal having a second level of voltage; and control logic means responsive to said mode signal having said first level of voltage, for applying individual control signals to the control electrodes of the four of said first through sixth solid-state switches associated with said predetermined two of said third through fifth nodes, for operating these four switches as a single-phase bridge rectifier, rectifying said single-phase AC voltage for providing a DC voltage across said first and second nodes, said control logic means also being responsive to said mode signal having said second level of voltage, for applying individual control signals to the control electrodes of said first through sixth solid-state switches, for operating these six switches as up to a three-phase bridge inverter, inverting the DC voltage from said DC voltage source to at least a first, up to second, and third phase AC voltages at said first through third output terminals, respectively.

7. The inverter/rectifier system of claim 6, further including:

said source of DC voltage being a battery;

second switching means responsive to the connection of said single-phase AC voltage across said pair of input terminals, for connecting the positive terminal of said battery to said second node, and the negative terminal of said battery to said first node, thereby permitting recharging of said battery by the DC voltage resulting from the rectification of said single-phase AC voltage.

8. The inverter/rectifier system of claim 7, wherein said control logic means includes a microprocessor system programmed for producing said control signals.

9. In an electric vehicle including a polyphase AC drive motor, and at least one battery having positive and negative terminals as a primary power source, a converter system having a polyphase bridge circuit operable as an inverter, for inverting the DC voltage from said battery to a polyphase AC voltage for application to the windings of said motor, and responsive to single-phase AC line voltage for operating the bridge circuit as a rectifier for rectifying said line voltage into a DC voltage for recharging said battery, said converter system comprising:

first through sixth solid-state current control devices each having a control electrode receptive of a control signal, a first electrode, and a second electrode, said devices being arranged into said bridge circuit having a first node of commonly connected first electrodes of said first through third solid-state devices, a second node of commonly connected second electrodes of said fourth through sixth devices, third, fourth and fifth nodes of commonly connected second and first electrodes of said first and fourth, second and fifth, third and sixth devices, respectively, each one of said devices being responsive to a control signal for conducting current between their respective first and second electrodes;

first and second terminals for receiving single-phase AC line voltage;

first switching means connected to said first and second terminals, responsive to the removal of said AC line voltage from said terminals, for connecting said third, fourth and fifth nodes to individual ones of said three-phase windings of said motor, respectively;

second switching means connected to said first and second terminals, responsive to the application of said AC line voltage to these terminals, for individually connecting said terminals to and thereby applying said AC line voltage to a predetermined two of said third, fourth and fifth nodes, respectively;

third switching means connected to said first and second terminals, responsive to the application of said AC line voltage across said terminals, for connecting said positive and negative terminals of said battery to said second node and said first node, respectively, and responsive to the removal of said AC line voltage from said terminals for reversing the aforesaid connections of said positive and negative terminals;

a mode terminal for receiving a mode signal;

a reference terminal for connection to a point of reference potential;

fourth switching means connected to said first and second terminals, responsive to the application of said AC line voltage to these terminals, for connecting the positive terminal of said battery to said mode terminal, thereby producing a "high" level mode signal, and responsive to the removal of said AC line voltage from said first and second terminals, for connecting said reference terminal to said mode terminal, thereby producing a "low" level mode signal; and controller means responsive to said mode signal being "high" for producing control signals for operating the four of said first through sixth solid-state devices associated with said predetermined two of said third, fourth and fifth nodes as a single-phase rectifier, and responsive to said mode signal being "low", for producing control signals for operating said first through sixth solid-state devices as a three-phase bridge inverter.

10. The electric vehicle of claim 9, wherein said controller means is further responsive to the level of the "high" level mode signal, for changing the conduction times or angles of said devices in the rectifier mode relative to each half-cycle of said AC line voltage, for reducing the rate of charging said battery as it approaches full charge.

11. The electric vehicle of claim 10, wherein said controller means includes a preprogrammed microprocessor for generating said control signals.

12. The electric vehicle of claim 9, wherein said first through sixth solid-state switches each consist of a silicon controlled rectifier having a gate electrode as said control electrode, an anode electrode as said first electrode, and a cathode electrode as said second electrode.

13. The electric vehicle of claim 9, wherein said first through sixth solid-state switches each consist of a gate-turnoff silicon controlled rectifier having a gate electrode as said control electrode, and anode and cathode electrodes as said first and second electrodes, respectively.

14. The electric vehicle of claim 9, wherein said first through sixth solid-state switches each consist of an NPN switching transistor having a base electrode, collector electrode, and emitter electrode, as said control, first and second electrodes, respectively.

15. The electric vehicle of claim 9, wherein said first through fourth switching means are all included as individual switches within a single AC relay, said relay having a coil connected between said first and second terminals and energizable by AC line voltage, for operating said first through fourth switching means responsive to said AC line voltage.

16. A converter system selectively operable as a single or polyphase bridge inverter in one mode of operation, or as a single-phase bridge rectifier in another mode of operation, comprising;

said bridge including at least four solid-state current control devices each having a control electrode, and a main current conduction path, individual pairs of said devices having their main current conduction paths connected in series between first and second nodes with the common connections between each pair of devices forming third and fourth nodes, respectively, for a two-phase bridge of four such devices, and third, fourth, and fifth nodes, for a three-phase bridge of six such devices;

a pair of batteries connected in series having free positive and free negative terminals, respectively;

a plurality of output terminals where AC voltages are developed; for application to a load;

a pair of input terminals for receiving single-phase AC line voltage;

first switching means for normally connecting said free positive and negative terminals across said first and second nodes, respectively, for current flow into said bridge from said batteries during the inversion mode of operation of said bridge, and responsive to said AC line voltage for reversing the connections of said free positive and free negative terminals for current flow into said batteries during the rectification mode of operation of said bridge;

second switching means for normally connecting said third and fourth nodes, and when applicable also said fifth node, to individual ones of said plurality of output terminals responsive to said AC line voltage for opening these connections;

third switching means connected between said pair of input terminals and said third and fourth nodes, respectively, responsive to said single-phase AC line voltage for connecting this voltage across said third and fourth nodes;

a reference terminal for receiving a source of reference potential, connected to the common connection of said pair of batteries;

a mode terminal where a mode signal is developed;

fourth switching means for normally connecting said reference terminal to said mode terminal for providing a first level of mode signal, said fourth switching means being responsive to said AC line voltage for connecting said free positive terminal to said mode terminal, for providing a second level of mode signal; and controller means connected to said mode terminal, for providing individual control signals to the control electrodes of said solid-state devices, responsive to said mode signal having said first level, for operating said bridge as an inverter, for selectively inverting the DC voltage from said batteries into a single-phase voltage or polyphase AC voltages across given ones of said plurality of output terminals and said reference terminal, and responsive to said second level of said mode signal for providing rectification of said single-phase AC line voltage to a DC voltage for recharging said battery.

* * * * *